United States Patent
Kitanaka et al.

(10) Patent No.: US 7,671,585 B2
(45) Date of Patent: Mar. 2, 2010

(54) ROTATION ANGLE DETECTING DEVICE WITH A SELECTING MEANS FOR SELECTING A PAIR OF OUTPUT SIGNALS OF THE MAGNETO-SENSING ELEMENTS

(75) Inventors: Tatsuya Kitanaka, Nagoya (JP); Takashi Kawashima, Nagoya (JP); Kouichirou Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 341 days.

(21) Appl. No.: 11/902,422

(22) Filed: Sep. 21, 2007

(65) Prior Publication Data

US 2008/0074102 A1  Mar. 27, 2008

(30) Foreign Application Priority Data

Sep. 26, 2006  (JP)  .............................. 2006-260426

(51) Int. Cl.
  *G01B 7/30*  (2006.01)
(52) U.S. Cl. ................. 324/207.25; 324/207.2

(58) Field of Classification Search ........................ None
  See application file for complete search history.

(56) References Cited

U.S. PATENT DOCUMENTS

2008/0272834 A1* 11/2008 Uemura et al. .............. 327/544

FOREIGN PATENT DOCUMENTS

JP  62-095402  5/1987

* cited by examiner

*Primary Examiner*—Jay M Patidar
(74) *Attorney, Agent, or Firm*—Nixon & Vanderhye, PC

(57) ABSTRACT

A rotation angle detecting device includes a magnetic field forming member, magneto-sensing IC circuit including first and second sensing sections in a magnetic field to have a first preset angle between them, and a selecting circuit. One of the first and second sensing section includes plural magneto-sensing elements whose sensing surfaces face in directions different from one another by a second preset angle. When the magnetic field forming member rotates relative to the magneto-sensing means, the magneto-sensing elements respectively provide the output signals. The selecting circuit selects a pair of the output signals of the magneto-sensing elements that is closest to a preset phase difference angle.

9 Claims, 5 Drawing Sheets

ROTATION ANGLE DETECTING DEVICE WITH A SELECTING MEANS FOR SELECTING A PAIR OF OUTPUT SIGNALS OF THE MAGNETO-SENSING ELEMENTS

CROSS REFERENCE TO RELATED APPLICATION

The present application is based on and claims priority from Japanese Patent Application 2006-260426, filed Sep. 26, 2006, the contents of which are incorporated herein by reference.

BACKGROUND OF THE INVENTION

1. Field of the Invention

The present invention relates to a rotation angle detecting device for detecting a rotation angle of a rotating object and a rotation angle control system equipped with the rotation angle detecting device.

2. Description of the Related Art

JP-62-95402-A discloses a rotation angle detecting device in which a change in a magnetic field formed by a permanent magnet is detected by a pair of Hall elements, whose analog output signals are converted into trigonometric functions to calculate a rotation angle.

In this rotation angle detecting device, if two Hall elements are positioned in such that the phase difference between the output signals thereof becomes a preset angle a from each other, such as 90 degrees as shown in FIG. 8, each of the output signals 400, 402 of the Hall elements outlines a sinusoidal curve as shown in FIG. 9 when a rotating object rotates. In other words, the output signal 400 is a sine curve, and the output signal 402 is a cosine curve.

In case where: the rotation angle of a rotating object is $\theta$; and the voltages of the output signals 400, 402 are respectively V1 and V2; the rotation angle $\theta$ can be obtained by the following expression.

$$\theta = \arctan(\sin\theta/\cos\theta) = \arctan(V1/V2) \quad (1)$$

However, the phase difference between the output signals of the Hall elements may change due to a variation in the angle $\alpha$ between two Hall elements 302, a variation in distance between the Hall elements, a variation in position of the permanent magnet and/or a variation in the distribution of the magnetic field formed by the permanent magnet. Such a change in the phase difference may hinder accurate measurement of the rotation angle.

SUMMARY OF THE INVENTION

Therefore, the invention has been made to solve the above-stated problem.

Another object of the invention is to provide a rotation angle detecting device or a rotation control device that can provides a pair of output signals without delay.

Another object of the invention is to provide a rotation angle control system that can control the rotation angle of an actuator at a high speed.

According to a feature of the invention, a rotation angle detecting device for detecting a rotation angle of a rotating object includes a magnetic field forming member, magneto-sensing means that includes a first sensing section and a second sensing section disposed in the magnetic field to have a first preset angle between them, at least one of the first and second sensing section including a plurality of magneto-sensing elements whose sensing surfaces face in directions different from one another by a second preset angle and selecting means for selecting a pair of output signals of the magneto-sensing elements that is closest to a preset phase difference angle.

Therefore, the rotation angle detecting device according to the invention provides an outside ECU with a most suitable pair of analog output signals for calculating an accurate rotation angle without delay.

In the above rotation angle detecting device, each of the magneto-sensing elements preferably includes a Hall element. The magneto-sensing means is preferably disposed on a semiconductor chip, and each of the magneto-sensing elements has a sensing surface perpendicular to a surface of the semiconductor chip. Further, the selecting means may be disposed on the same semiconductor chip together with the magneto-sensing means.

In the above rotation angle detecting device, each of the first and second sensing sections preferably includes a plurality of magneto-sensing elements, and the second preset angle may be different from the second preset angle.

In the above rotation angle detecting device, the selecting means may include a memory storing selecting data, an output selecting circuit for selecting a pair of output signals that has a phase difference closest to a preset phase difference based on the selecting data. In this device, the selecting means may include a pair of amplifiers connected to the output selecting circuit, thereby amplifying output signals of the output selecting circuit 70 to provide an outside ECU with a pair of analog output signals.

The above-featured rotation angle detecting device may be used with calculating means for calculating rotation angle based on the pair of output signals of the magneto-sensing elements that is closest to a preset phase difference angle and operating means for operating an actuator based on the rotation angle calculated by the calculating means, thereby forming a rotation angle control system.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
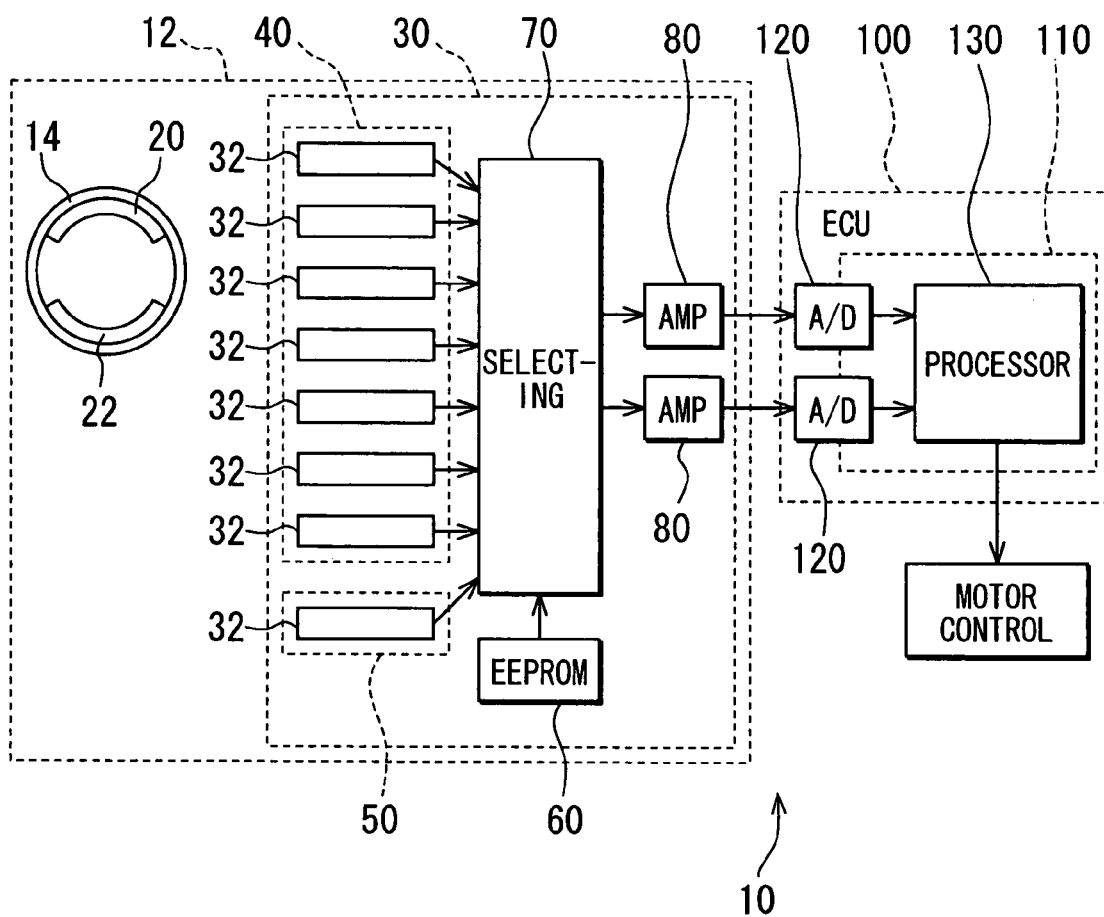
FIG. 1 is a block diagram of a rotation angle control system according to the first embodiment of the invention.

Some preferred embodiments according to the present invention will be described with reference to the appended drawings.

A rotation angle control system according to the first embodiment of the invention will be described with reference to FIGS. 1-3.

The rotation angle control system 10 includes a rotation angle detecting device 12, a Hall IC 30 and an ECU 100. The rotation angle detecting device 12 includes a yoke 14, a pair of arc-shaped permanent magnets 20, 22 and the IC 30. The yoke 14 is a cylindrical magnetic member that is rotated by a rotating object such as a rotary shaft of an electric motor. The permanent magnets 20, 22 are arc-shaped members fixed to the inner cylindrical surface of the yoke 14 at an interval of 180 degrees in angle from each other. The permanent magnets 20, 22 are magnetized in a radial direction to form a generally parallel magnetic field that extends in the radial direction. In other words, the permanent magnet 20 is magnetized to have a magnetic pole (e.g. S-pole) different from the magnetic pole (e.g. N-pole) of the permanent magnet 22 at the surfaces thereof facing each other.

Figure 2:
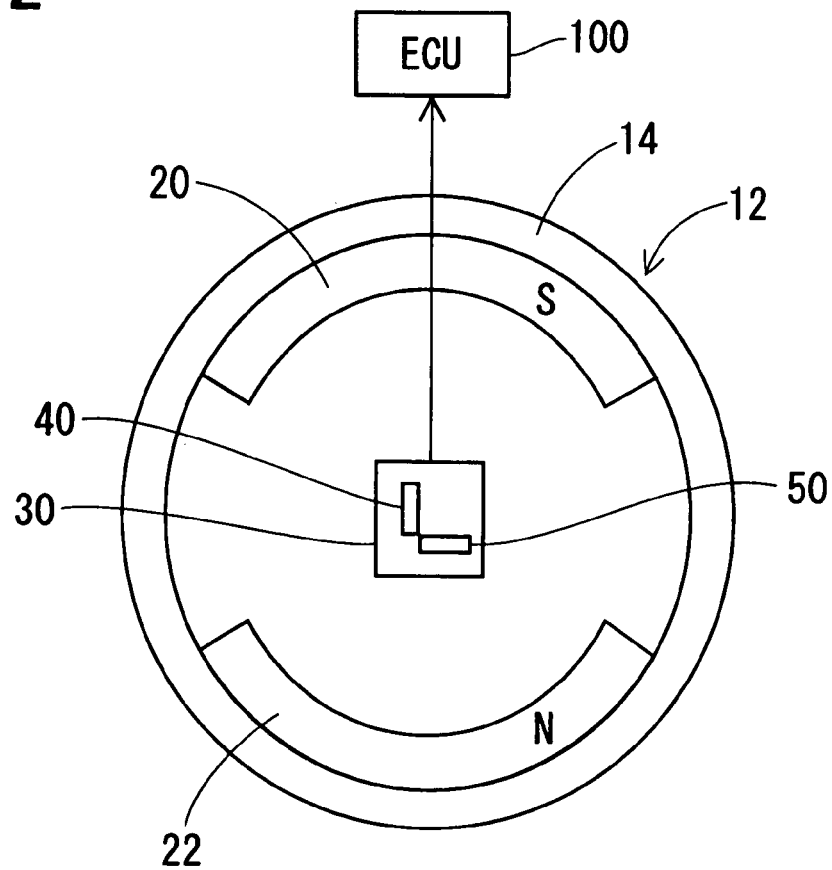
FIG. 2 is a schematic plan view of the rotation angle detecting device of the rotation angle control system according to the first embodiment.

As shown in FIG. 1, the Hall IC 30 includes plural (e.g. eight) Hall elements 32, an EEPROM 60, an output selecting circuit 70 and a pair of amplifier circuits 80, which are integrally formed in a semiconductor chip. Each of the Hall elements 32 has a magneto-sensing surface that is substantially perpendicular (e.g. $90°±0.10$) to the surface of the semiconductor chip.

Figure 3:
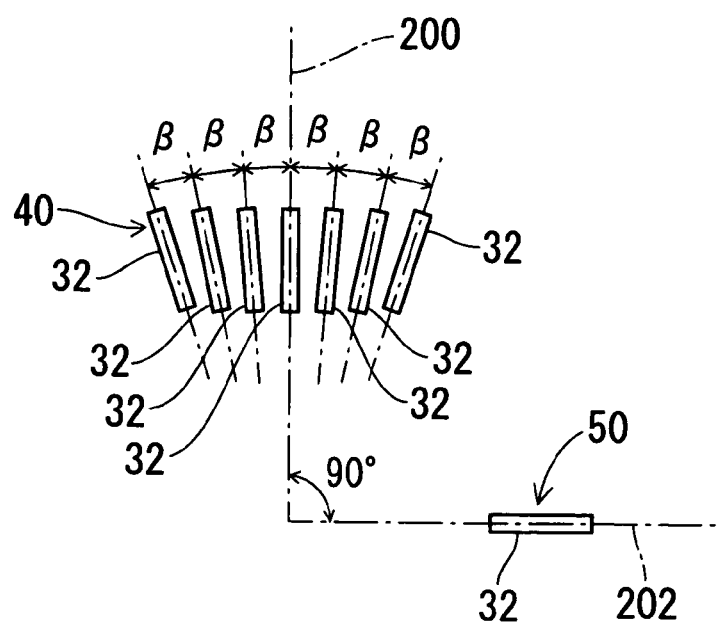
FIG. 3 is a schematic diagram of an arrangement of a first and second sensing sections of the rotation angle detecting device shown in FIG. 2.

As shown in FIG. 3, the Hall elements 32 are divided into a first sensing section 40 and a second sensing section 50.

Plural (e.g. seven) Hall elements 32 of the first sensing section 40 are formed in a circumferential direction of the cylindrical yoke 14 on the semiconductor chip to be equally divided by a first base line 200. The sensing surfaces of the Hall elements 32 respectively face in directions different from one another by an angle of β (e.g. 0.1°), while the sensing element 32 positioned at the center has the sensing surface that faces in the direction of the first base line 200.

The Hall element 32 of the second sensing section 50 is formed on the semiconductor chip on a second line 202 that is perpendicular (90°) to the first base line 200 so that the sensing surface thereof faces in the direction parallel with the first base line 200 or perpendicular to the second line 202. The number of the Hall elements 32 and the angle β should be changed according to an accuracy requirement.

The EEPROM 60 stores selecting data for selecting one of the output signals of the Hall elements 32 of the first sensing section 40. The output selecting circuit 70 is constructed of a transistor switching circuit. The output selecting circuit 70 always takes in the output signal of the Hall element 32 of the second sensing section 50 and selects one of the output signals of the Hall elements 32 of the first sensing section 40 according to the selecting data. The amplifiers 80 respectively amplify the output signals of the output selecting circuit 70 and provides analog output signals.

The selecting data to be stored in the EEPROM 60 are stored in the following manner. At first, the Hall IC 30 is positioned as shown in FIG. 2. Then, a switching signal is applied to the selecting circuit 70 from outside the Hall IC 30 to pick up the output signals of the Hall elements 32 of the first sensing section 40 one after the other by the selecting circuit 70. Incidentally, the switching signal may be applied via an exclusive terminal of the Hall IC 30, a power terminal, an earth terminal or an output terminal thereof.

Then, the phase difference between the output signal of the Hall element 32 of the second sensing section 50 and each output signal of Hall elements 32 of the first sensing section 40 is examined to find out a phase difference that is closest to 90 degrees in angle, which is stored as the selecting data into the EEPROM 60. After the selecting data are stored in the EEPROM 60, a signal that is closest to 90 degrees is selected from the output signals of first sensing section 40. Then, a pair of signals whose phase difference is closest to 90 degrees is amplified by the pair of amplifier circuits 80 and outputted from the Hall IC 30.

The ECU 100 calculates a rotation angle based on the output signal of the Hall IC 30. The ECU 100 includes a microcomputer 110, which has a pair of A/D converters 120 and a processor 130. The A/D converters respectively convert the analog output signals of the Hall IC 30 into digital sensor signals, and the processor 130 calculates a rotation angle by operating trigonometric functions based on the digital sensor signals. The microcomputer 110 controls an actuator or a motor based on the rotation angle.

Thus, the Hall IC 30 does not convert the analog signal to the digital signal. Therefore, time for detecting rotation angle can be reduced. Because the phase difference of the Hall elements 32 is corrected in the Hall IC 30, it is not necessary to rewrite the selecting data once the selecting data are stored even if the Hall IC 30 or the ECU 100 is replaced with another.

Figure 4:
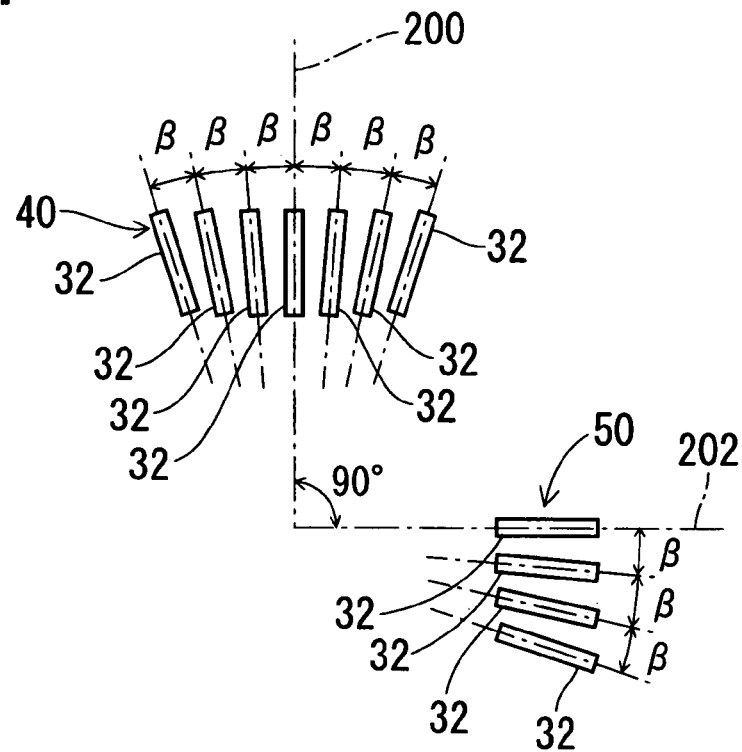
FIG. 4 is a schematic diagram of an arrangement of a first and second sensing sections of a rotation angle detecting device according to the second embodiment of the invention.

A rotation angle detecting device according to the second embodiment of the invention will be described with reference to FIG. 4.

Incidentally, the same reference numeral represents the same or substantially the same part, portion or component as the preceding embodiment hereafter.

In addition to plural (e.g. seven) Hall elements 32 of the first sensing section 40 that are formed in a circumferential direction of the cylindrical yoke 14, plural (e.g. four) Hall elements 32 of the second sensing section 50 are formed in the direction parallel to the base line so that the sensing surfaces thereof respectively face in directions different from one another by an angle of β (e.g. 0.1°), while the sensing element 32 positioned on the second base line 202 so that the sensing surface thereof faces in the direction parallel with the first base line 200.

Figure 5:
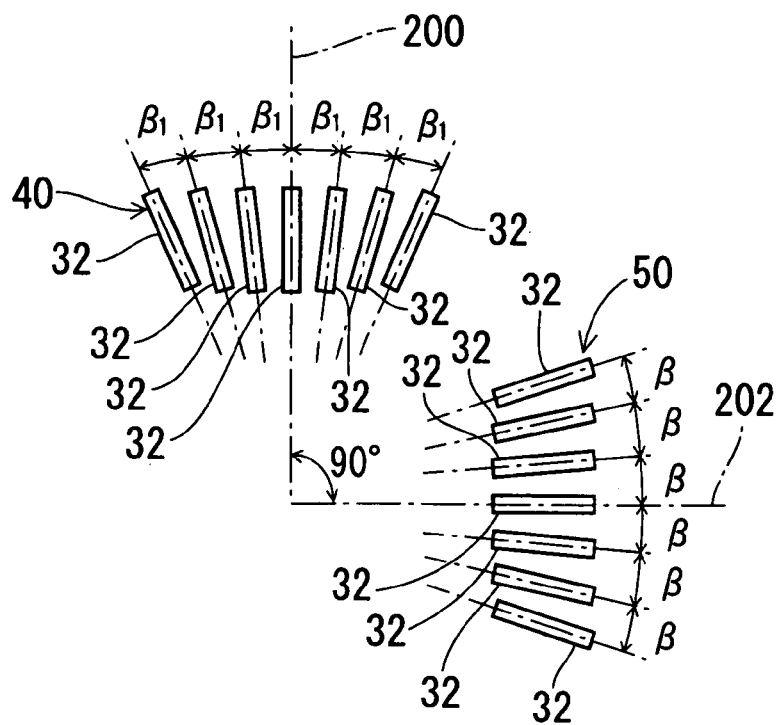
FIG. 5 is a schematic diagram of an arrangement of a first and second sensing sections of a rotation angle detecting device according to the third embodiment of the invention.

A rotation angle detecting device according to the third embodiment of the invention will be described with reference to FIG. 5.

The plural (e.g. seven) Hall elements 32 of the first sensing section 40 that are formed in a circumferential direction of the cylindrical yoke 14 so that the sensing surfaces thereof respectively face in directions different from one another by an angle of β1(e.g. 1°), and the plural (e.g. seven) Hall elements 32 of the second sensing section 50 are formed in the direction parallel to the first base line 200 so that the sensing surfaces thereof respectively face in directions different from one another by an angle of β (e.g. 0.1°).

In the second and third embodiment, the phase difference between the output signals of the first and second sensing sections 40, 50 can be adjusted at a higher accuracy than the first embodiment.

Figure 6:
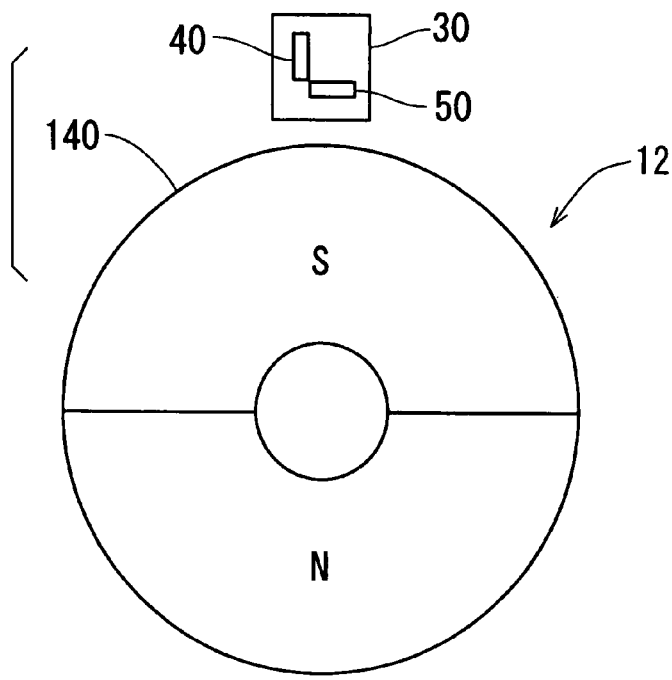
FIG. 6 is a schematic view of a rotation angle detecting device according to the fourth embodiment of the invention.

A rotation angle detecting device according to the fourth embodiment of the invention will be described with reference to FIG. 6.

The rotation angle detecting device 12 is constructed of a disk-shaped permanent magnet 140, instead of the yoke 14 and the pair of arc-shaped permanent magnets 20, 22, and the Hall IC 30. Other portions are substantially the same in construction as any of the preceding embodiments.

Figure 7:
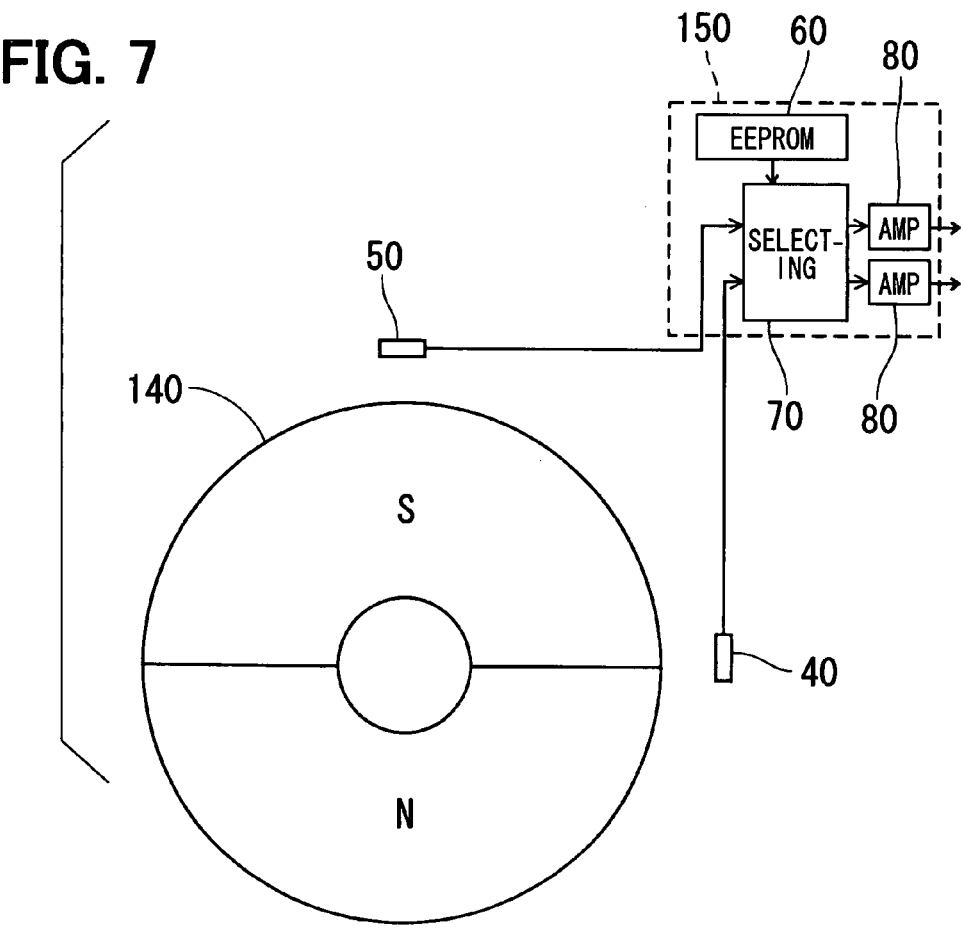
FIG. 7 is a schematic view of a rotation angle detecting device according to the fourth embodiment of the invention.
Figure 8:
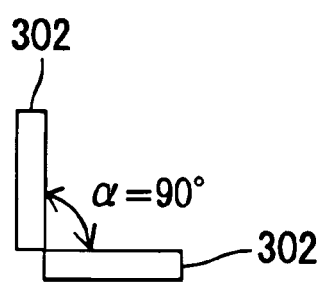
FIG. 8 illustrates a prior art arrangement of a pair of Hall elements.
Figure 9:
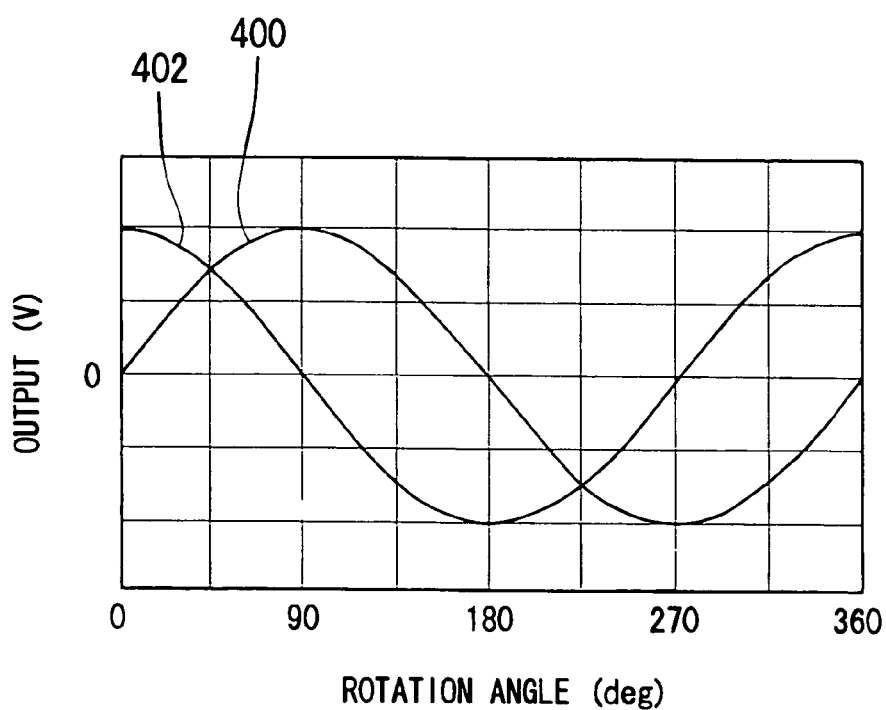
FIG. 9 is a graph showing a relation between the rotation angle of a rotating object and the output signal of a pair of Hall elements.

A rotation angle detecting device according to the fifth embodiment of the invention will be described with reference to FIG. 7.

The first and second sensing sections 40, 50 are respectively formed on separate semiconductor chips and located at the peripheries of the disk-shaped permanent magnet that is 90 degrees in angle separated from each other. The first and second sensing sections 40, 50 respectively includes Hall elements 32 arranged as described in the descriptions about the first, second and third embodiments. Because the first and second sensing sections 40, 50 are formed on separate chips, it is not necessary for each Hall element 32 to have a thin rectangular shape as shown above.

The rotation angle detecting device according to the fourth embodiment has an output selecting section 150 that integrally includes the EEPROM 60, the output selecting circuit 70 and a pair of amplifiers in a semiconductor chip. The output selecting section 150 takes in the output signals of the Hall elements 32 of the first and second sensing sections 40, 50, selects a pair of output signals that has a phase difference closest to a preset phase difference α based on the selecting data and provides the pair of output signals in analog signals.

After a pair of output signals that has a phase difference closest to a preset phase difference is selected, Hall elements that are not selected may be disconnected from the selecting circuit 70 by a laser or the like. In this case, the EEPROM 70 can be omitted.

Instead of the field forming members that include the permanent magnet 20, 22 and yoke 14, the Hall IC 30 may be rotated with a rotating object.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device for detecting a rotation angle of a rotating object comprising:
   a magnetic field forming member for providing a generally parallel magnetic field;
   magneto-sensing means including a first sensing section and a second sensing section disposed in the magnetic field to have a first preset angle between them, at least one of the first and second sensing section including a plurality of magneto-sensing elements whose sensing surfaces face in directions different from one another by a second preset angle; and
   selecting means, connected to the magneto-sensing elements of the first and second sensing sections, for selecting a pair of output signals of the magneto-sensing elements that is closest to a preset phase difference angle,
   wherein the magnetic field forming member rotates relative to the magneto-sensing means when the rotating object rotates so that the magneto-sensing elements respectively provide the output signals.

2. A rotation angle detecting device as in claim 1, each of the magneto-sensing elements comprises a Hall element.

3. A rotation angle detecting device as in claim 2, wherein:
   the magneto-sensing means is disposed on a semiconductor chip; and
   each of the magneto-sensing elements has a sensing surface perpendicular to a surface of the semiconductor chip.

4. A rotation angle detecting device as in claim 3, wherein the selecting means is disposed on the same semiconductor chip together with the magneto-sensing means.

5. The rotation angle detecting device as in claim 1, wherein:
   each of the first and second sensing sections includes a plurality of magneto-sensing elements and
   the second preset angle between the sensing surfaces of the magneto-sensing elements of the first sensing section is different from the second preset angle between the sensing surface of the magneto-sensing elements of the second sensing section.

6. A rotation angle detecting device as in claim 1, wherein the first preset angle is 90 degrees.

7. A rotation angle detecting device as in claim 1, wherein the selecting means comprises a memory for storing selecting data, an output selecting circuit for selecting a pair of output signals that has a phase difference closest to a preset phase difference based on the selecting data.

8. A rotation angle detecting device as in claim 7, wherein the selecting means further comprises a pair of amplifiers connected to the output selecting circuit for amplifying output signals of the output selecting circuit to provide a pair of analog output signals.

9. A rotation angle control system comprising:
   a rotation angle detecting device as in claim 1;
   calculating means for calculating rotation angle based on the pair of output signals of the magneto-sensing elements that is closest to a preset phase difference angle; and
   operating means for operating an actuator based on the rotation angle calculated by the calculating means.

* * * * *